US006901821B2

(12) United States Patent
Torrance et al.

(10) Patent No.: US 6,901,821 B2
(45) Date of Patent: Jun. 7, 2005

(54) STATOR DAMPER ANTI-ROTATION ASSEMBLY

(75) Inventors: Mark A. Torrance, Waterboro, ME (US); David P. Dube, Saco, ME (US)

(73) Assignee: United Technologies Corporation, Hartford, CT (US)

(*) Notice: Subject to any disclaimer, the term of this patent is extended or adjusted under 35 U.S.C. 154(b) by 410 days.

(21) Appl. No.: 10/002,594

(22) Filed: Nov. 20, 2001

(65) Prior Publication Data

US 2003/0094862 A1 May 22, 2003

(51) Int. Cl.[7] .......................... F16F 15/10; F04D 29/66; G05G 1/00

(52) U.S. Cl. ......................... 74/574; 415/119; 415/191; 416/145; 416/190; 416/219 R; 416/220 R; 403/20; 74/572

(58) Field of Search ............................. 416/190, 219 R, 416/220 R, 145; 403/20; 74/573 R, 572, 574

(56) References Cited

U.S. PATENT DOCUMENTS 3,736,811 A * 6/1973 Neary ...................... 74/573 R
3,881,844 A * 5/1975 Hennessey et al. ......... 416/145
3,986,779 A * 10/1976 Beckershoff ................. 403/20
4,480,957 A * 11/1984 Patel et al. ............. 416/220 R
4,721,434 A * 1/1988 Marshall et al. ............ 415/119
5,100,292 A * 3/1992 Matula et al. .......... 416/220 R
5,215,432 A * 6/1993 Pickering et al. ........... 415/119
5,240,375 A * 8/1993 Wayte .................... 416/219 R
5,346,362 A * 9/1994 Bonner et al. .............. 415/191
5,681,142 A * 10/1997 Lewis ........................ 415/119
6,155,789 A * 12/2000 Mannava et al. ....... 416/241 R
6,354,803 B1 * 3/2002 Grover et al. .............. 416/190

FOREIGN PATENT DOCUMENTS

GB 2106997 A * 4/1983 ................. 416/145
JP 2-153203 * 6/1990 ........... 74/573 R X

OTHER PUBLICATIONS

McGraw–Hill Dictionary of Scientific and Technical Terms, 1976, p. 1416.*

* cited by examiner

*Primary Examiner*—Vinh T. Luong
(74) *Attorney, Agent, or Firm*—Bachman & LaPointe, P.C.

(57) ABSTRACT

An assembly for preventing rotation of a damper in a stator system includes a slot in the damper and a block for engaging the slot to prevent rotation of the damper. The block is positioned within a groove located at a mid span portion of an inner air seal.

14 Claims, 2 Drawing Sheets

STATOR DAMPER ANTI-ROTATION ASSEMBLY

BACKGROUND OF THE INVENTION

The present invention relates to a device for preventing tangential rotation of a damper used in a stator.

Anti-rotation devices are placed on stators to prevent the tangential rotation of spring damper assemblies used therein. Typically, these anti-rotation devices consist of pins or lugs welded into machined/EDM milled holes or slots on an edge of the stator inner air seal. The welds inherently crack during engine operation creating a risk of domestic object damage.

There is a need for an improved anti-rotation device for such stator spring damper assemblies which eliminates the risk of such domestic object damage.

SUMMARY OF THE INVENTION

Accordingly, it is an object of the present invention to provide an improved stator damper anti-rotation assembly.

It is a further object of the present invention to provide an assembly as above which significantly decreases the risk of domestic object damage.

It is yet a further object of the present invention to provide an assembly as above which has increased durability and which is easy to produce.

The foregoing objects are attained by the stator damper anti-rotation assembly of the present invention.

In accordance with the present invention, an assembly for preventing rotation of a damper used in a stator system of an engine is provided. The assembly broadly comprises a block which engages a slot in the damper to prevent rotation of the damper. The block is positioned within a groove milled in an inner air seal which forms part of the stator system. In a preferred embodiment of the present invention, side portions of the block are brazed to side edges of the groove to effectively eliminate any risk of domestic object damage.

Other details of the stator damper anti-rotation assembly of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
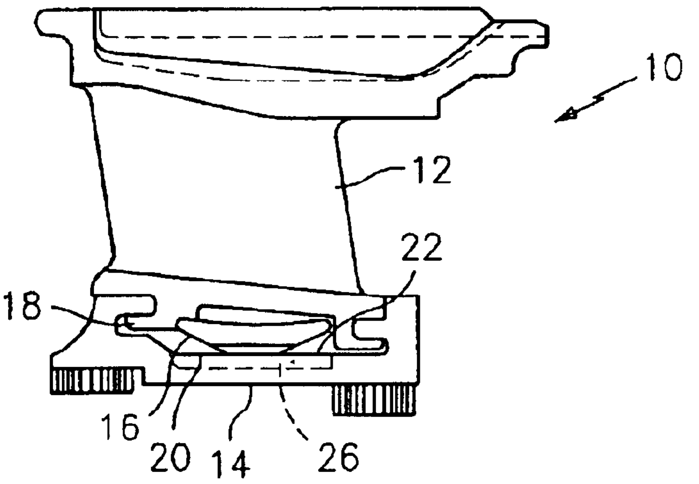
FIG. 1 is a side view of a stator system having an inner air seal, a damper, and a damper anti-rotation device in accordance with the present invention.
Figure 4:
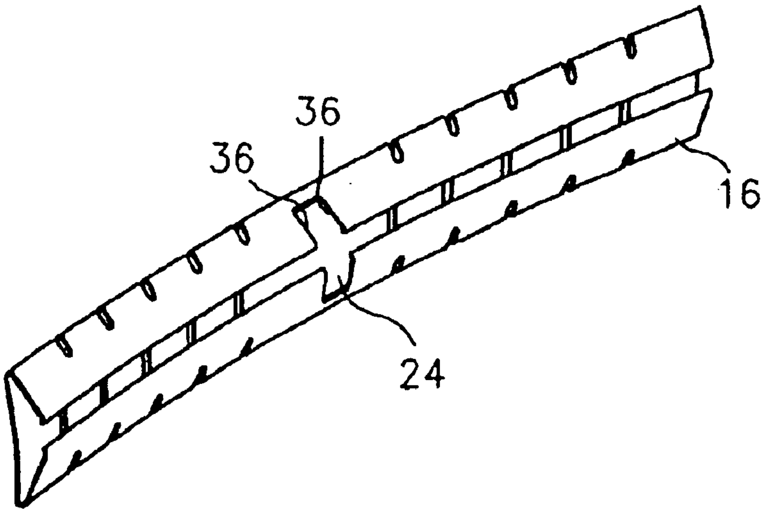
FIG. 4 is a perspective view of the damper and the slot for receiving the anti-rotation device of the present invention.

Referring now to the drawings, FIG. 1 illustrates a stator system 10. The system 10 includes a stator 12, an inner air seal 14 which mates with a lower portion 18 of the stator 12, and a damper 16 positioned between the lower portion 18 of the stator and a surface 20 of the inner air seal 14. The damper 16 may comprise any suitable damper known in the art, such as the spring type, metallic sheet damper shown in FIG. 4. During operation of the engine of which the stator system 10 is part, tangential vibrations will cause rotation of the damper 16 unless the damper 16 is restrained from such movement.

In the instant invention, rotation of the damper 16 is prevented by the presence of a block 22 which fits within a slot 24 in the damper 16. As can be seen from FIG. 4, damper 16 has a longitudinal axis and slot 24 is oriented perpendicular to the longitudinal axis. When assembled, the damper slot 24 engages the block 22 and thereafter traps the block 22 in place during engine operation. The engagement between the block 22 and the walls 36 of the damper slot 24 prevents rotation of the damper 22.

Figure 2:
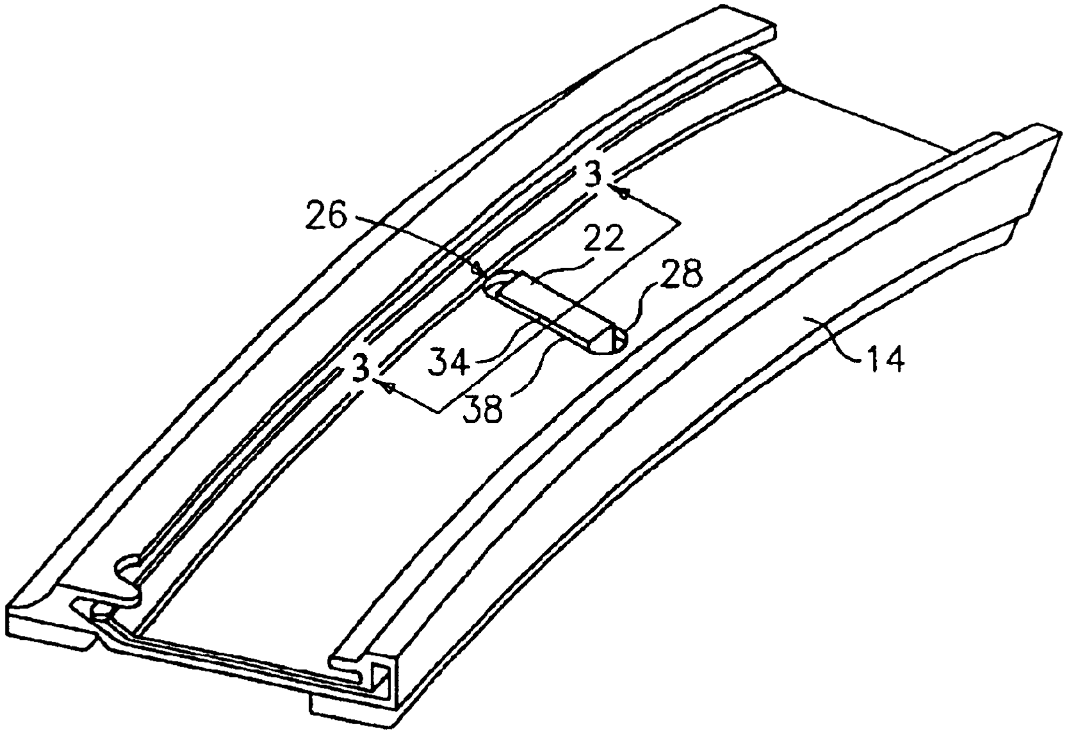
FIG. 2 is a perspective view of the inner air seal used in the stator system of FIG. 1 with the anti-rotation device of the present invention.

As shown in FIG. 2, the block 22 is seated within a groove 26 machined in the inner air seal 14. The block 22 is preferably located at a mid-span portion of the inner air seal 14. This allows the damper 16 to be symmetric so it can fit on the inner air seal 14 in either direction. The groove 26 may be machined using any suitable technique known in the art. Preferably, the groove 26 is machined to a depth which is approximately fifty to sixty-five percent of the height h of the block 22. The width of the groove 26 is determined by the width of the block 22. If desired, the groove 26 may have rounded or arcuately shaped edges 28 joining substantially planar side edges 38. The arcuately shaped edges 28 help properly seat the block 22.

Figure 3:
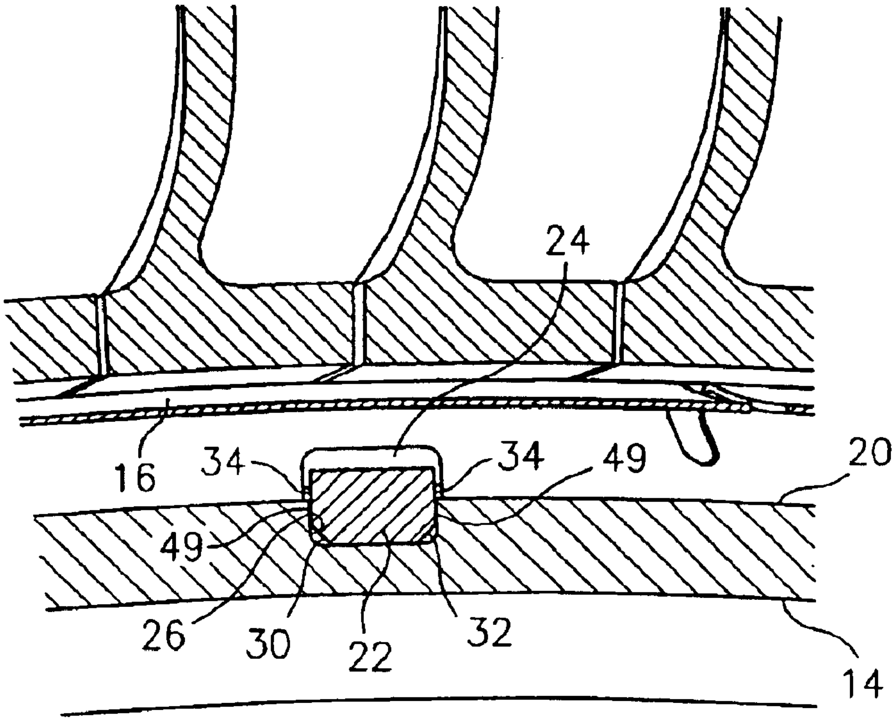
FIG. 3 is a sectional view of the anti-rotation device of the present invention taken along lines 3—3 of FIG. 2.

The block 22 may be formed from any suitable metallic or non-metallic material known in the art. As shown in FIG. 3, the block 22 has a substantially rectangular cross-section with chamfered edges 30 and 32. The edges 30 and 32 are chamfered to assist in the positioning of the block 22 in the groove 26. The chamfer depends on how much of the block 22 is to be fitted down into the groove 26. The chamfer has to be sufficient to clear the radius in the groove 26.

After the block 22 has been placed in the groove 26, a line of brazing material 49 is applied to each side portion 34 of the block 22 and the corresponding side edge 38 of the groove 26 to secure the block 22 in place. The brazing material 49 may comprise any suitable brazing material known in the art and may be applied using any suitable brazing technique known in the art. The block 22 can be brazed to the inner air seal 14 during normal braze operations, thus eliminating the need for additional operations. The braze joint which is thus formed is a more robust means for attaching the block. If the braze joint fails during engine operation, the block 22 will be trapped in the groove 26, thereby significantly decreasing, and effectively eliminating, any risk of domestic object damage.

As previously discussed, during engine operation, vibrations will tend to cause rotation of the damper 16. This rotation is prevented by the interaction between the block 22 and the slot 24 in the damper 16.

The anti-rotation device and damper assembly of the present invention has increased durability. Further, the anti-rotation device and damper assembly is easily reproducible and lends itself to use in a wide variety of stator assemblies. For example, the size of the block 22 and the damper slot 24 may be varied for different stator assemblies, thereby assuring that the correct damper assembles to the correct inner air seal and eliminating assembly mistakes. Producibility is improved due to the location and the shape of the block 22.

It is apparent that there has been provided in accordance with the present invention a stator damper anti-rotation assembly which fully satisfies the objects, means, and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations as fall within the broad scope of the appended claims.

What is claimed is:

1. An assembly for preventing rotation of a damper in a stator system comprising:

a slot in said damper in said stator system;

a block for engaging said slot and thereby preventing said rotation of said damper; and said block having a substantially rectangular cross section and two chamfered edges for facilitating placement of said block within said groove.

2. An assembly according to claim 1, further comprising:

said stator system including an inner air seal; and said block being located in a groove machined in said inner air seal.

3. An assembly according to claim 1, wherein said block is located at a mid span of the inner air seal.

4. An assembly according to claim 1, wherein said block has a height and said groove has a depth which is from about 50 to 65% of said block height.

5. An assembly according to claim 1, wherein said block has side portions and said groove has side edges and said side portions of said block are brazed to said side edges of said groove.

6. An assembly according to claim 1, wherein said block is formed from a metallic material.

7. An assembly according to claim 1, wherein said block is formed from a non-metallic material.

8. An assembly for preventing rotation of a damper in a stator system comprising:

a slot in said damper in said stator system;

a block for engaging said slot and thereby preventing said rotation of said damper; and said groove having substantially planar side walls joined by rounded edge portions.

9. A stator system for use in an engine comprising:

a stator;

an inner air seal;

a damper positioned between said inner air seal and said stator;

said damper having a slot; and a block for engaging said slot in said damper so as to prevent rotation of said damper during engine operation.

10. A stator system according to claim 9, further comprising:

a groove machined in said inner air seal; and said block being positioned within said groove.

11. A stator system according to claim 10, wherein said block has two chamfered edges to allow said block to be positioned within said groove.

12. A stator system according to claim 9, wherein said damper comprises a spring damper.

13. A stator system according to claim 9, wherein said block is located at a mid span portion of said inner air seal.

14. A stator system for use in an engine comprising:

a stator;

an inner air seal;

a damper positioned between said inner air seal and said stator;

said damper having a slot;

a block for engaging said slot in said damper so as to prevent rotation of said damper during engine operation;

a groove machined in said inner air seal;

said block being positioned within said groove;

said block having side wall portions and said groove having side edge portions; and brazing material between said side wall portions and said side edge portions to secure said block in said groove.

* * * * *